March 7, 1961 J. N. TROXELL, JR 2,973,777
PRESSURE RELIEF VALVE
Filed March 20, 1959 3 Sheets-Sheet 1
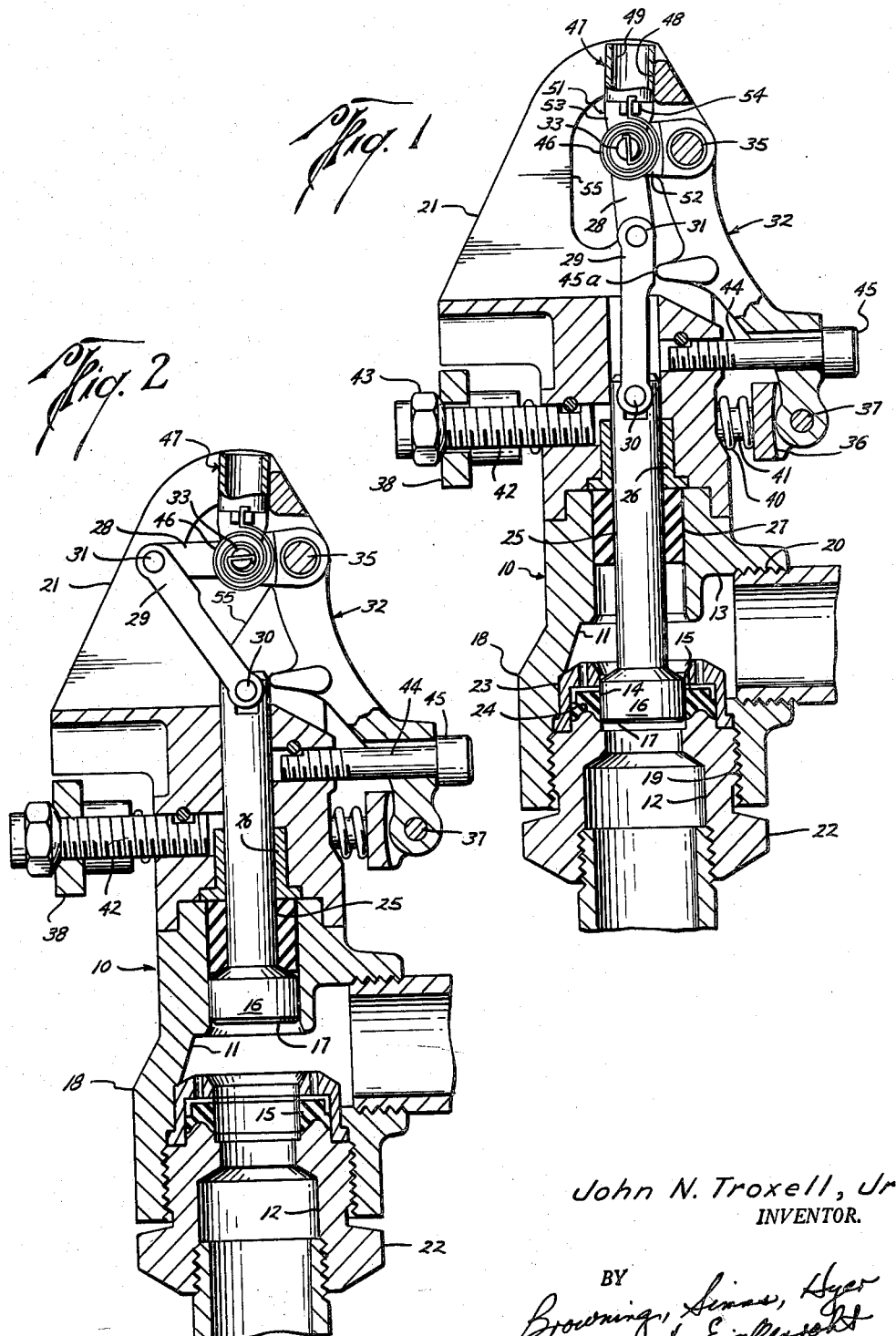
John N. Troxell, Jr.
INVENTOR.
BY Browning, Simms, Hyer & Eickerson
ATTORNEYS

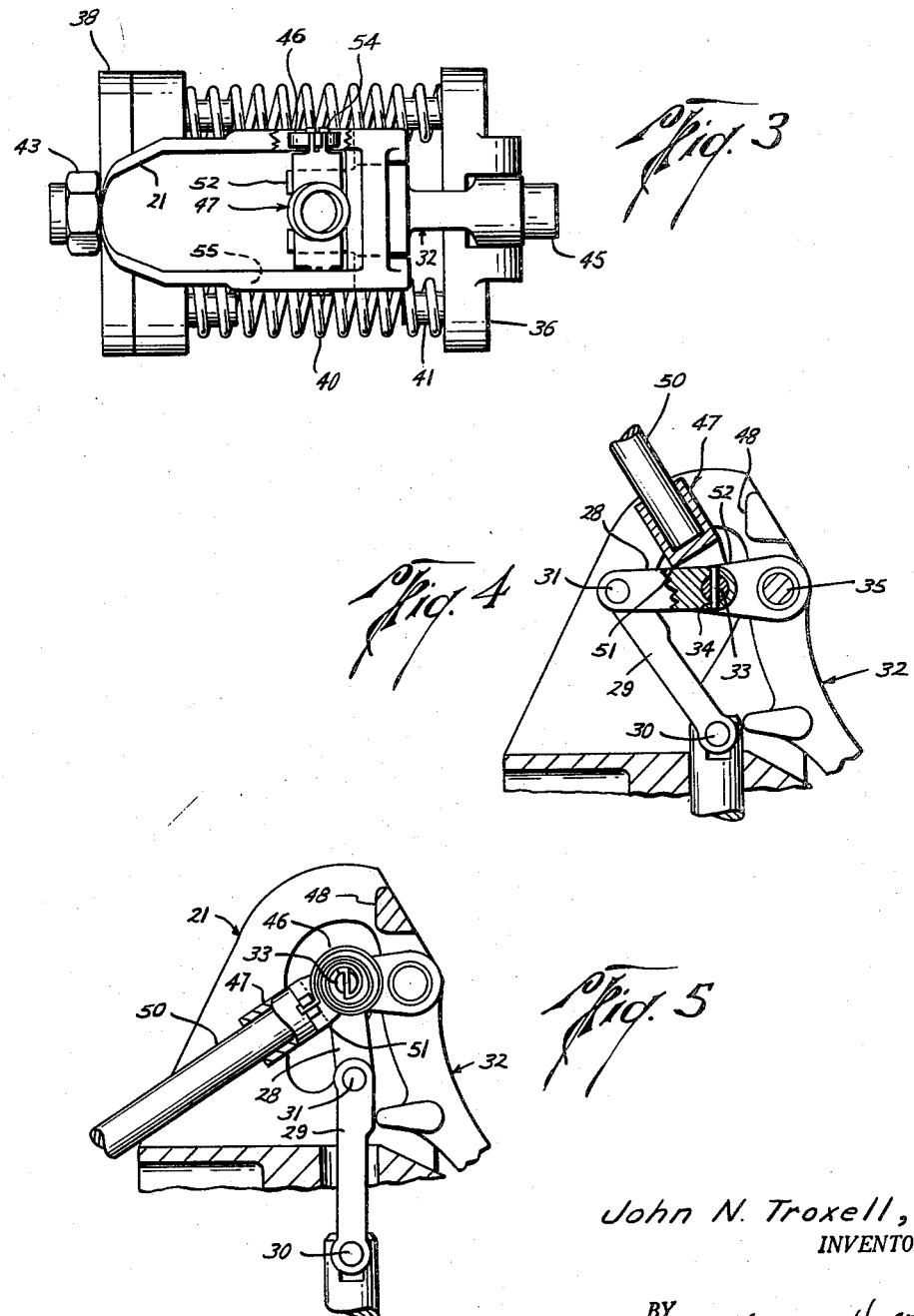

March 7, 1961  J. N. TROXELL, JR  2,973,777
PRESSURE RELIEF VALVE

Filed March 20, 1959  3 Sheets-Sheet 3

John N. Troxell, Jr.
INVENTOR.

BY
Browning, Simms, Hyer
& Eickenroht
ATTORNEYS

United States Patent Office 2,973,777
Patented Mar. 7, 1961

2,973,777

PRESSURE RELIEF VALVE

John N. Troxell, Jr., Houston, Tex., assignor to Cameron Iron Works, Inc., Houston, Tex.

Filed Mar. 20, 1959, Ser. No. 800,723

11 Claims. (Cl. 137—467)

This invention relates generally to improvements in pressure relief valves of the type in which the force for holding the valve member closed is adapted to be decreased at a very rapid rate when line pressure reaches a predetermined value to be relieved, such that the valve member is moved to a fully open position despite the sudden drop in line pressure as it is initially unseated. More particularly, it relates to specific improvements in a valve of the type described in the copending application of Herbert Allen, Serial No. 794,696, filed February 20, 1959, and entitled "Pressure Relief Valve."

In the valve shown in the aforementioned application, there are some circumstances under which the valve may not remain in its "set" position. This may occur, for example, when the valve is on one side so that the links are free to fall by gravity into their "collapsed" position or, even when the valve is upright, when the pressure of the fluid to be relieved drops below that necessary to hold the valve member up.

In the same valve of this earlier application, the links are manually returned from the collapsed position they occupy in relieving a pressure to the set position by means of a handle or lever in the form of a rod projecting outwardly from one of the links. This rod is removable from the link when they are reset so that it will not swing up and strike an operator who might be adjacent to the valve upon a subsequent relief. If it isn't removed, however, the rod will very likely be thrown free of the links with great force as the links collapse. Since, as a practical matter, operators don't always remember to remove the rod, the hazard remains.

An object of this invention is to provide a pressure relief valve of the type described in the earlier application which will remain in its set position until the pressure to be relieved occurs, regardless of its disposition relative to ground level or the fact that the pressure of the fluid to be relieved drops below that necessary to hold the valve member up.

Another object is to provide such a valve in which the links are automatically returned from collapsed to set position in response to a predetermined drop in pressure of the relieved fluid; and, more particularly, in which the valve member is closed to reset the valve with little or no throttling action.

A further object is to provide such a valve having a lever for returning the links from collapsed to set position which is so arranged as to eliminate any possibility of harm to the operator.

A still further object is to provide such a valve having a lever of the type described in the foregoing object which is so connected to the links as to accomplish one or both of the other objects of the invention; and, more particularly, to provide a simplified and compact connection between the lever and links for accomplishing these dual purposes.

These and other objects are accomplished by a pressure relief valve which comprises, as in the valve of the earlier application, a valve body having a flowway therethrough and a valve member which moves between positions opening and closing the flowway. The valve member has a pressure responsive surface exposed to the fluid within the flowway in the closed position therefor for urging it toward its open position.

An arm is pivotally mounted on the body for swinging in opposite directions and means are provided for yieldably urging it in one of said directions. This arm is connected to the valve member by a pair of pivotally connected links and means are provided for locating the links in a position with the axis of the pivotal connection therebetween to one side of an imaginary straight line through the axes of their connections to the arm and valve member. Thus, when the controlled pressure acts on the aforementioned surface of the valve member, the links transmit a force from the arm to the valve member due to the urging means which is effective to prevent movement of the valve member in an opening direction until the pressure of the fluid within the flowway rises to a predetermined value.

The last-mentioned means is responsive to initial movement of the valve member in an opening direction for moving the links to another position in which the axis of their pivotal connection is disposed on the other side of the imaginary straight line. This renders the links ineffective to transmit force from said arm to said valve member upon continued movement thereof in an opening direction so that the valve member is free to move quickly to a fully opened position.

In accordance with the present invention, means are provided for yieldably opposing movement of the links in a direction from their first-mentioned position toward their other position past a position in which the axis of the pivotal connection therebetween is aligned with said imaginary straight line. The force with which such movement is opposed is thereby effective to maintain the links with the pivotal connection therebetween to the one side of such line until the line pressure rises to the predetermined value to be relieved, even though the valve may be disposed on its side or the pressure of the line drops below that necessary to keep the valve member up.

More particularly, this means yieldably urges the links in a direction from said other position thereof toward their first-mentioned position. Thus, the links are positively maintained in their set position as determined by the locating means. It is also contemplated that such means may be of such strength as to be effective to automatically return the links from collapsed to set position in response to a predetermined drop in pressure of the line fluid.

In the preferred form of the invention, this yieldable urging means comprises a torsion spring having one end connected for movement with one of the links and the other end anchored against pivoting with said one link so as to increase the torsional force therein as the links move in a direction from said first-mentioned to said other position. More particularly, this spring provides an initial torsional force for yieldably maintaining the links in their first-mentioned position. In a still further preferred embodiment, a pin pivotally connecting one of the links to the arm is fixed to the one link for rotation therewith, and the aforementioned one arm of the torsion spring is connected to this pin for pivoting with the one link.

The improved manual manipulation of the links is accomplished by means of a lever mounted for swinging between a substantially stationary position with respect to the body and another position in force-transmitting relation with the links for returning them from said other to said first-mentioned position. This lever may comprise a lug having a socket for receiving a handle such as a rod or, if desired, may comprise the handle or rod itself, and spring means are provided for automatically returning it from its other to its substantially stationary position where it remains during collapse of the links. Thus, there is no danger of an operator being injured by the handle, either due to its swinging with the links or due to its being hurled therefrom.

In accordance with another novel aspect of the invention, the torsion spring for yieldably opposing movement of the links and, more particularly, for yieldably urging the links toward their set position is also employed for returning the lever to its substantially stationary position. For this purpose, the other end of the spring connected at its one end to one of the links is connected to the lever for swinging therewith.

Preferably, the lever is pivotally mounted on the pin connecting the one link to the arm and is swingable into engagement with said one link to return the links in a manner described. The substantially stationary position of the lever is defined by a stop on the body into engagement with which it is urged by the initial torsional force in the spring.

In the drawings, wherein like reference characters are used throughout to designate like parts:

Fig. 1 is a longitudinal sectional view of an illustrative embodiment of the present invention with the links in set position to maintain the valve member in closed position;

Fig. 2 is a longitudinal sectional view similar to that of Fig. 1, but with the links collapsed upon movement of the valve member to opened position;

Fig. 3 is a top plan view of the valve with the links in the position of Fig. 1;

Fig. 4 is a longitudinal sectional view of the upper end of the valve with the links in the position of Fig. 2, but with the lever swung into engagement with the upper link for returning the links to set position;

Fig. 5 is a view similar to Fig. 4, but with the lever swung to a position in which it has moved the links to set position.

Figure 6:
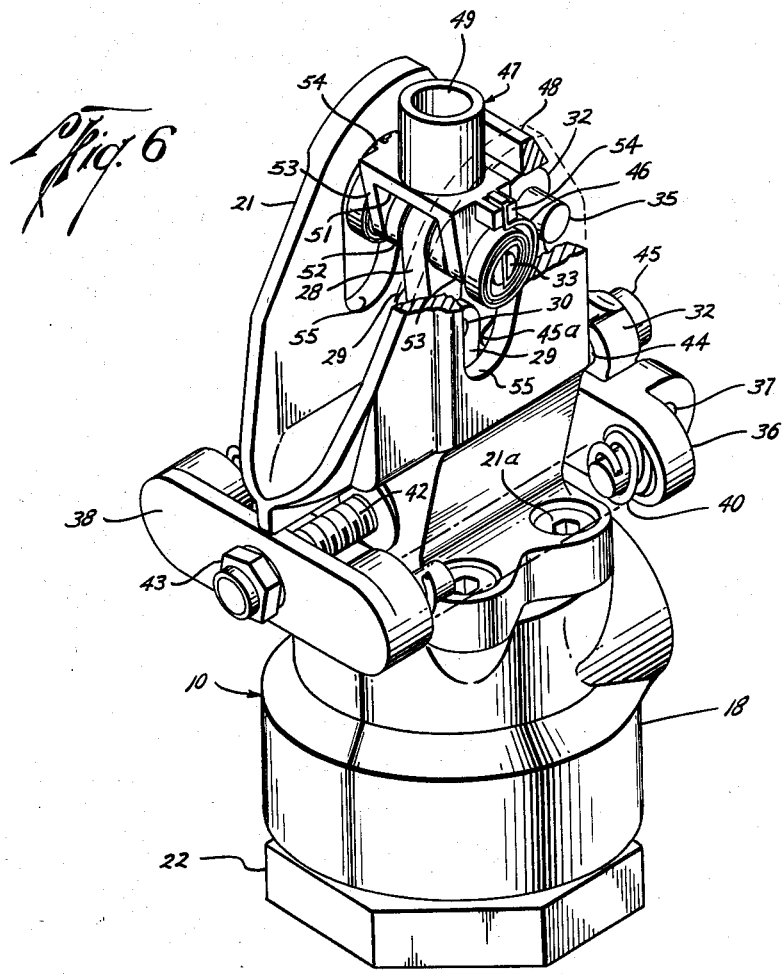
Fig. 6 is a perspective view of the valve with the links and lever in the position of Fig. 1 and with its upper end broken away in part.

Referring now in more detail to the above-described drawings, the valve will be seen to comprise a valve body 10 having a flowway 11 therethrough and in inlet 12 to the flowway and an outlet 13 therefrom formed at approximately right angles to one another. A seat 14 on the flowway intermediate the inlet and outlet is defined by the inner periphery of an annular seal ring 15 of rubber or other suitable resilient material. A valve member 16 is movable in the valve body between a position within the seal ring to close the flowway, as shown in Fig. 1, and another position above the seal ring to open the flowway, as shown in Fig. 2.

It will be understood from Fig. 1 that the pressure of the controlled fluid within the inlet 12 acts upon the lower surface 17 of the valve member to urge it toward its open position. As soon as the valve member is unseated, however, the pressure of this fluid will drop suddenly. It will also be apparent from Fig. 2 that the pressure of the relieved fluid within the flowway 11 acts upon the lower surface of the valve member 17 to urge it in a direction to maintain the valve member in the open position.

The valve body 10 is made up of a central portion 18 having threaded openings 19 and 20 formed therein in surrounding relation to the inlet and outlet, respectively, a bonnet 21 bolted or otherwise secured to the central portion as at 21a, and a hollow nut 22 threaded into the opening 19 in the central body portion to form the inlet 12.

The seal ring 15 is removably held in place between a retainer ring 23 abuttable with a counterbore in the central body portion and the inner end of the nut 22. An annular bead 24 on the nut expands the lower end of the ring which is energized by the fluid in the inlet into sealing engagement with the valve member 16 during movement of the valve member within the ring, in a manner to be described hereinafter.

The valve member is carried on the lower end of a stem 25 which extends through coaxial openings through the central body portion and body and is slidably received within a bushing 26 carried in the bonnet. The lower end of this bushing has an annular flange which is held between the lower end of the bonnet and upper end of the central body portion 18. An annular ring 27 of rubber or other suitable material is received within the central body portion to slidably surround the stem 25 beneath the bushing 26 and engage and cushion the shock of the valve member 16 as it moves to the open position of Fig. 2.

It is apparent from the drawings and the foregoing description that the seal ring 15 and retainer ring 23 may be replaced merely upon removal of the nut 22. It is further apparent that the bushing 26 and sleeve 27 may be readily replaced upon separation of the bonnet and central body portion.

The upper end of the stem 25 projects above the opening through the bonnet and is pivotally connected to the lower of links 28 and 29 by means of a pin 30. A single upper link 28 is pivotally connected at its lower end to a pair of the lower links 29 by means of a pin 31 and at its upper end to the forked end of an arm 32 by means of a pin 33 fixed to the upper link by a pin 34 (see Fig. 4). The top of the bonnet 21 of the valve body comprises a yoke which defines a space for the links as they move between their set position of Fig. 1 and their collapsed position of Fig. 2. This space also accommodates the portion of the arm 32 which is connected to the upper link 28 as well as other parts to be described hereinafter.

As described in the earlier application, when the links 28 and 29 are held in a rigid angular position with respect to one another, as shown in Figs. 1 and 5, they form a compressive force-transmitting connection between the arm 32 and the valve member 16. Although the pivotal connection of the links to the valve member is direct in the illustrative embodiment of the drawings, it should be understood that such connection may be indirect through any suitable means for transmitting movement between the valve member and the links.

An intermediate portion of the aforementioned arm 32 is pivotally mounted in the space between opposite sides of the yoke of the bonnet by means of pins 35. The end of the arm opposite the forked end pivotally connected to the upper link 28 is pivotally connected to a bar 36 by means of a pin 37. Compression coil springs 40 are supported at opposite ends by means of stubs 41 on the bar as well as similar parts on another bar 38 on the other side of the valve body. The leftmost bar 38 is held in fixed position with respect to the body by means of a threaded rod 42 connected at its inner end to the body and having a nut 43 on its outer end for bearing on the outer side of the bar 38. Thus, the compression coil springs urge the bar 36 in a rightward direction to thereby urge the arm 32 in a counterclockwise pivotal direction about the pin 35. The position of the nut 43 along the rod may be adjusted in an obvious manner to regulate the force with which the arm is so urged.

Swinging of the arm 32 in a counter-clockwise direction is limited by means of a bolt 44 threadedly connected to the bonnet 21 of the valve body at its inner end and having an enlarged head 45 at its outer end engageable with the arm about the opening therethrough which receives the bolt. This arm is also provided with a part 45a which projects from the inner side thereof to engage the lower links 29 in the closed position of the valve member. Thus, this part locates the links in the position shown in Fig. 1 in which the axis of the pin 31 connecting the links is disposed to the right side of an imaginary straight line through the axes of the pins 30 and 33 connecting such links to the valve member and arm 32, respectively.

As previously mentioned, the links thus form a compression force-transmitting connection between the arm 32 and the valve member 16 which maintains the valve member closed until the pressure of the controlled fluid within the inlet 12 rises to a predetermined value. That is, the valve member will remain closed until the force of the fluid acting on the face 17 thereof overcomes the effective force of the coil springs 40 acting on the upper end of the link 28 through the axis of pin 33.

When this latter condition occurs, however, and the valve member begins to move upwardly, the force-transmitting connecting provided by the links 28 and 29 will also move the links and the pin 33 upwardly. This swings the arm 32 in a clockwise direction against the urging of springs 40 and causes the part 45a thereon to move inwardly or to the left while bearing upon the links 29. Consequently, concurrently with movement of the valve member in an opening direction, the links are moved to the left toward a position in which the axis of the pin 31 connecting them is aligned with the aforementioned imaginary straight line between the axes of pins 30 and 33. During such initial movement of the valve member in an upwardly direction, it will maintain sealing engagement with the seating surface 14, as more fully described and shown in the earlier application. Thus, there is no venting of the contained fluid in the inlet 12 and the force acting on the lower surface of the valve member continues to move it upwardly.

However, as the links reach the aforementioned position in which the axis of the pin 31 therebetween is aligned with the imaginary straight line between the axes of pins 30 and 33, and are then moved toward their collapsed position in which the axis of such pivotal connection is disposed on the left side of said imaginary straight line, they will no longer be effective to transmit compressive force from the arm to the valve member upon continued movement of the valve member in an opening direction. Consequently, the links readily move into their collapsed position, as shown in Figs. 2 and 4, and the valve member is permitted to move upwardly at a rapid rate as it rises above the seating surface 14. As will be understood from Fig. 2, this opening movement of the valve member and collapsing of the links continues until the valve member engages the cushioning sleeve 27.

As can be seen from the drawings, the distance between the axes of pins 33 and 35 is considerably less than the distance between the axes of pins 35 and 37. Since the effective force of the spring 40 which resists upward movement of the valve member is a multiple of the force due to line pressure as determined by the inverse ratio of these distances, the valve member may be closed against high pressures by means of a coil spring of relatively small size. It would also be understood, as more fully explained in the earlier application, that the pin 31 travels only a short distance from the set position of Fig. 1 to the position in which its axis is aligned with the imaginary straight line between the axes of pins 30 and 33. This reduces to a very small amount the distance which the valve member must move upwardly in an opening direction before the links are rendered ineffective to transmit the compressive force of the springs 40 to the valve member. As also mentioned in the earlier application, the extent of this movement of the links is adjustable by means of the threaded bolt 44.

When the links are returned from the collapsed position of Fig. 2 to the set position of Fig. 1, in a manner to be described hereinafter, they will move through a position in which the axis of pin 31 is to the left of the aforementioned imaginary straight line a distance corresponding to that of the axis of pin 31 to the right of this line in the Fig. 1 position. As the pin moves from this position to its aligned position, the valve member will move downwardly from its position of Fig. 1 in a closing direction within the seal ring 15. Thus, the links do not have to overcome the force of the compressive springs 40 as they would if movement of the valve member in a closing direction were limited by the seat 14.

That portion of the valve thus far described corresponds in many respects to the valve shown in the aforementioned earlier application. However, as previously mentioned, the valve may be disposed on one side (the leftmost as seen in the drawings) so that the links 28 and 29 will have a tendency to fall from set to collapsed position by the force of gravity. As has also been mentioned above, even if the valve is disposed upright and the pressure within the inlet drops below a predetermined value, the force thereof acting upon the lower end of the valve member 16 in its closed position, as shown in Fig. 1, may not be sufficient to maintain the links in their set position. That is, as will be understood from Fig. 1, the links will have a natural tendency to straighten out and assume a position in which the axis of the pin 31 is aligned with the aforementioned imaginary straight line. If this condition were to occur, there would be no assurance that the links would form a force-transmitting connection between the valve member and arm to hold the valve member closed until the pressure within the inlet rises to a predetermined value.

As previously described, and in accordance with the present invention, the links are maintained in their set position of Fig. 1, regardless of the disposition of the valve or the drop in pressure of the fluid within inlet 12, by means of a torsion spring 46 connected at its inner end to the pin 33 for pivotal movement with the link 28 and at its outer end to a lever 47 pivotally mounted for swinging about said pin. More particularly, the spring is wound or tightened to have an initial torsional force tending to unwind it in the position shown in Fig. 1, and the lever 47 is engaged with a stop 48 on the yoke of the bonnet. Due to this initial loading of the spring 46, and the fact that it is wound in a counterclockwise direction from the inside out, the lever 47 is yieldably urged in a clockwise direction into a stationary position in engagement with the stop 48 and the upper link 28 is yieldably urged in a counterclockwise direction so as to maintain the links 29 in engagement with part 45a on the arm 32.

As can be seen from Fig. 2, as the links move from set into collapsed position, the inner end of the torsion spring 46 is swung with the upper link 28 in a clockwise direction so as to further tighten the spring. Thus, the torsional force of the spring urging the links toward their set position increases as they are moved into the collapsed position.

However, in order to provide a valve in which this spring is particularly useful in automatically resetting the valve upon a predetermined drop in the line pressure, it is contemplated that the rate of the spring will be relatively low. Thus, even though the torsional force on the links due to the spring increases as they collapse and decreases as they move toward set position, the force transmitted to the valve member through the links will decrease as the valve member moves toward open position and increase as it moves toward closed position. In this manner, the valve member will be opened and closed with little or no throttling.

More particularly, and as will be seen from the drawings, the force of the spring is transmitted to the valve member through the pivotal connection of the links 29 thereto. Thus, as the links move from their collapsed position toward the position in which the axis of their pivotal connection is aligned with the aforementioned straight line, the force transmitted to the valve member will increase. On the other hand, as the links move from this latter position toward their collapsed position, the force of the spring transmitted to the valve member will decrease. As long as this increase and decrease in force transmission is greater than the decrease and increase of the torsional force provided by the spring, the valve member will automatically close in the manner described and will move smoothly upon opening during a relieved operation.

As shown, the lever 47 comprises a socket 49 to receive a rod or handle 50, as shown in Figs. 4 and 5. It should be understood, however, that the rod may form an integral part of the lever, if desired. At any rate, the rod is manually swung in a counterclockwise direction from its stationary position of Fig. 2 until an edge 51 of the lug engages the link 28 intermediate the pins 33 and 31. Continued swinging of the rod with the lever so engaged with the upper link will move both links from the collapsed position of Fig. 4 to the set position of Fig. 5.

In this latter position, the outer end of the torsion spring 46 has been swung from the stationary position of Fig. 1 in a counterclockwise direction so as to wind the spring tighter and thereby increase its torsional force tending to return the lever as well as the links to the Fig. 1 position. Therefore, when the links have been reset and the lever is released, either by removal of the rod 50 or upon its release, the torsion spring automatically returns the lever to its stationary position of Figs. 1 and 2. Due to the aforementioned effect of the collapse of the links upon the spring—i.e., to wind it tighter—the lever 47 will be maintained in its stationary position during such collapse so that, as previously mentioned, there is no danger of the operator being injured by swinging of the lever or a flying rod.

Referring now to the details of the above-described novel apparatus, it will be seen, particularly in connection with Figs. 3 and 6, that the end of the arm 32 pivotal about the pin 33 is provided with spaced apart legs 52 which receive the link 28 therebetween. The lever 47, on the other hand, has spaced apart legs 53 on the end thereof which are pivotally mounted on the pin 33, and such legs straddle the legs 52 of the arm 32, again as best shown in Figs. 3 and 6.

Each side of the yoke of the bonnet is provided with an opening 55 therein to accommodate an outwardly projecting lug 54 on each outer side of the lever as well as the torsion springs 46 which are connected at their outer ends to the lugs. More particularly, each of the outer ends of the pins 33 and the lever 54 are provided with slots opening onto such sides, and the opposite ends of the spring are inserted within such slots merely upon a lateral sliding movement. As can be seen from the drawings, the outermost portions of the ends of the springs are turned down so that they will not be pulled loose from the slots.

It will be understood from this description that this particular arrangement of the torsion spring not only enables a maximum amount of leverage to be applied to the links by the lever 47 in returning them from collapsed to set position, but also requires only a minimum amount of spring movement during movement of the links between collapsed and set positions as well as swinging of the lever from its stationary position to its position for moving the links from collapsed to set position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body for swinging in opposite directions, means yieldably urging the arm in one of said directions, a pair of pivotally connected links pivotally connecting the arm to the valve member, means for locating the links in a position with the axis of the pivotal connection therebetween to one side of an imaginary straight line between the axes of their pivotal connections with said arm and valve member for transmitting a force from the urging means to the valve member which is effective to prevent opening movement of the valve member, until the pressure of the fluid within the flowway reaches a predetermined value, and moving said links to another position in which the pivotal connection therebetween is disposed on the other side of said line, in response to the initial movement of the valve member in an opening direction, for rendering said links ineffective to transmit force from said urging means to said valve member upon continued opening movement thereof, and means yieldably opposing movement of said links in a direction from said first-mentioned toward said other position past a position in which the axis of the pivotal connection therebetween is aligned with said imaginary straight line.

2. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links pivotally connecting the arm to the valve member, means yieldably urging the arm in a pivotal direction to dispose the axis of the pivotal connection between the links to the side of an imaginary straight line between the axes of their pivotal connections with the arm and valve member, means for locating the links in a position with the axis of their pivotal connection to one side of the line to provide a force-transmitting connection between the arm and valve member for maintaining said valve member in its closed position, until the pressure of the fluid within the flowway reaches a predetermined value, and responsive to initial movement of the valve member in an opening direction for moving said links to another position in which the axis of their pivotal connection to one another is on the other side of said line to render said force-transmission ineffective upon continued opening movement of the valve member, and means yieldably urging the links in a direction from said other toward said first-mentioned position.

3. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body for swinging in opposite directions, means yieldably urging the arm in one of said directions, a pair of pivotally connected links pivotally connecting the arm to the valve member, means for locating the links in a position with the axis of the pivotal connection therebetween to one side of an imaginary straight line between the axes of their pivotal connections with said arm and valve member for transmitting a force from the urging means to the valve member which is effective to prevent opening movement of the valve member, until the pressure of the fluid within the flowway reaches a predetermined value, and moving said links to another position in which the pivotal connection therebetween is disposed on the other side of said line, in response to the initial movement of the valve member in an opening direction, for rendering said links ineffective to transmit force from said urging means to said valve member upon continued opening movement thereof, and a torsion spring having one end connected for movement with one of the links and the other end anchored against movement with said one link so as to increase the torsional force therein as the links move in a direction from said first-mentioned to said other position.

4. A pressure relief valve of the character defined in claim 3, wherein said spring provides an initial torsional force for yieldably maintaining said links in said first-mentioned position.

5. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links, pins pivotally connecting said links to the arm and valve member, respectively, the pin pivotally connecting one link to the arm being fixed to the one link for rotation therewith, means yieldably urging the arm in a pivotal direction to dispose the axis of the pivotal connection between the links to the side of an imaginary straight line between the axes of their pivotal connections with the arm and valve member, means for locating the links in a position with the axis of their pivotal connection to one side of the line to provide a force-transmitting connection between the arm and valve member for maintaining said valve member in its closed position, until the pressure of the fluid within the flowway reaches a predetermined value, and responsive to initial movement of the valve member in an opening direction for moving said links to another position in which the axis of their pivotal connection to one another is on the other side of said line to render said force-transmission ineffective upon continued opening movement of the valve member, and a torsion spring having one end connected to the pin pivotally connecting the one link to the arm for rotation with said one link and the other end anchored against pivoting with said one link so as to increase the torsional force therein as the links move in a direction from said first-mentioned to said other position.

6. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links pivotally connecting the arm to the valve member, means yieldably urging the arm in a pivotal direction to dispose the axis of the pivotal connection between the links to the side of an imaginary straight line between the axes of their pivotal connections with the arm and valve member, means for locating the links in a position with the axis of their pivotal connection to one side of the line to provide a force-transmitting connection between the arm and valve member for maintaining said valve member in its closed position, until the pressure of the fluid within the flowway reaches a predetermined value, and responsive to initial movement of the valve member in an opening direction for moving said links to another position in which the aixs of their pivotal connection to one another is on the other side of said line to render said force-transmission ineffective upon continued opening movement of the valve member, a lever, means mounting the lever for swinging between a substantially stationary position with respect to the body and another position in force-transmitting relation with the links for returning them from said other to said first-mentioned position, and spring means for automatically returning said lever from its other position to its substantially stationary position.

7. A pressure relief valve of the character defined in claim 6, wherein said spring means is connected between said lever and said links to yieldably oppose movement of said links in a direction from said first-mentioned position toward said other position past a position in which the pivotal connection therebetween is aligned with said imaginary straight line.

8. A pressure relief valve of the character defined in claim 6, wherein said spring means is connected between the lever and one of the links to yieldably urge the links in a direction toward said first-mentioned position.

9. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links, pins pivotally connecting said links to the arm and valve member, respectively, the pin pivotally connecting one link to the arm being fixed to the one link for rotation therewith, means yieldably urging the arm in a pivotal direction to dispose the axis of the pivotal connection between the links to the side of an imaginary straight line between the axes of their pivotal connections with the arm and valve member, means for locating the links in a position with the axis of their pivotal connection to one side of the line to provide a force-transmitting connection between the arm and valve member for maintaining said valve member in its closed position, until the pressure of the fluid within the flowway reaches a predetermined value, and responsive to initial movement of the valve member in an opening direction for moving said links to another position in which the axis of their pivotal connection to one another is on the other side of said line to render said force-transmission ineffective upon continued opening movement of the valve member, a stop on the body, a lever pivotally mounted on the pin pivotally connecting the one link to the arm for swinging between a position in engagement with the stop and another position engageable with said one link to force the links from said other to said first-mentioned position, and spring means for automatically returning the lever from its other position to its position in engagement with the stop.

10. A pressure relief valve of the character defined in claim 9, wherein said spring means comprises a torsion spring having one end connected to said pin for rotation with the one link and the other end anchored to the lever for urging the links in a direction toward said first-mentioned position.

11. A pressure relief valve of the character defined in claim 10, wherein said lever has a lug on one side thereof and said pin extends outwardly on the same side, each of said lug and pin extensions having a slot opening onto said one side, and the opposite ends of the torsion spring are removably inserted within the slots.

No references cited.